Feb. 11, 1947.  A. SIMMON ET AL  2,415,568
PHOTOGRAPHIC ENLARGER
Filed Oct. 19, 1945   4 Sheets-Sheet 1
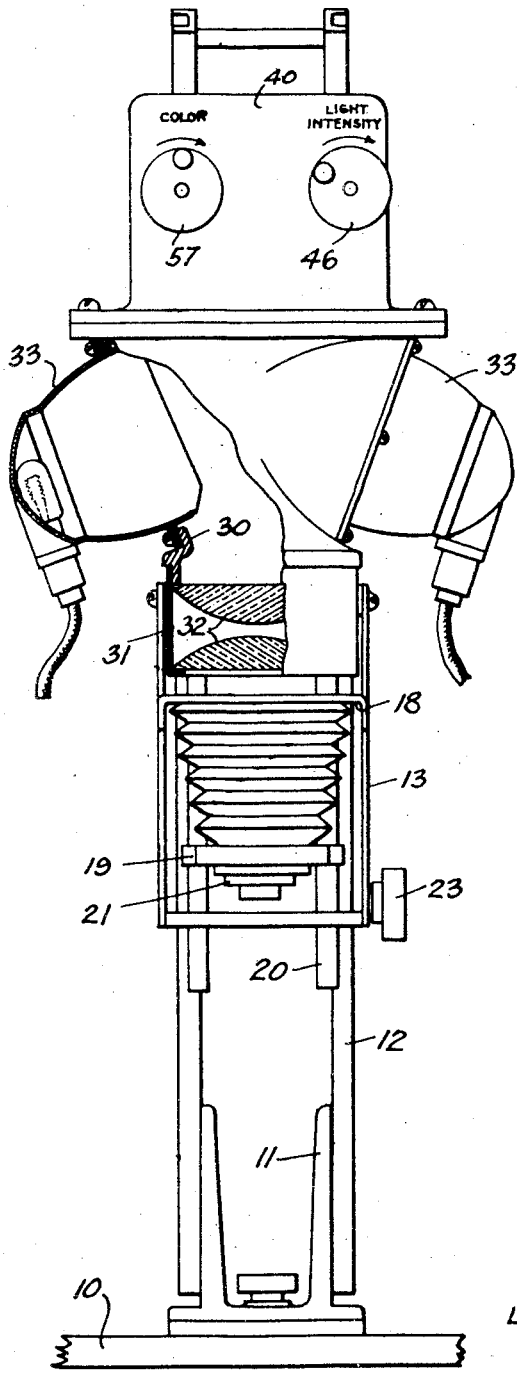
Fig: 1
Alfred Simmon
Louis L. Weisglass
INVENTORS
BY Walter E. Wallheim
ATTORNEY.

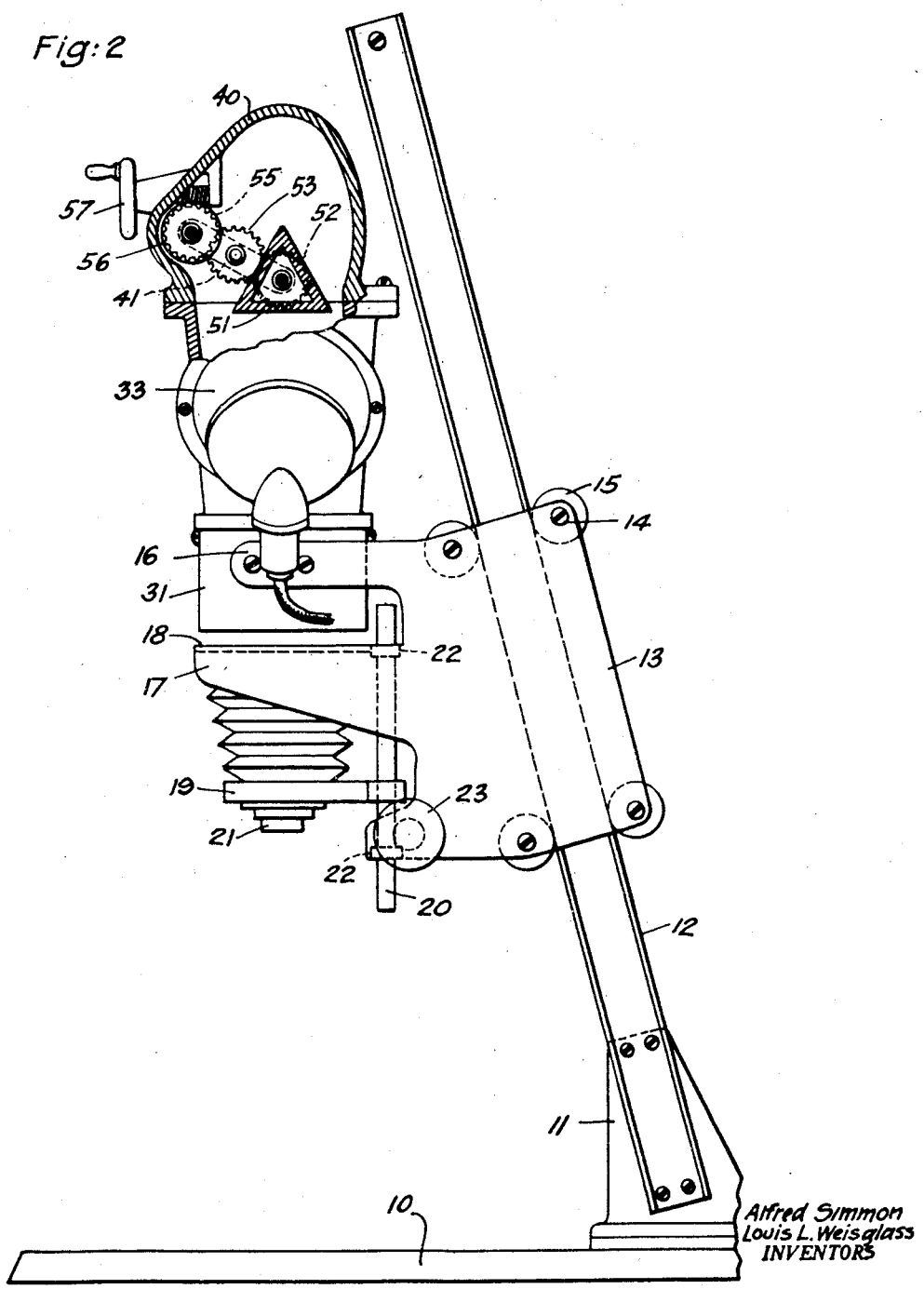

Feb. 11, 1947. A. SIMMON ET AL 2,415,568
PHOTOGRAPHIC ENLARGER
Filed Oct. 19, 1945 4 Sheets-Sheet 3
Fig: 3
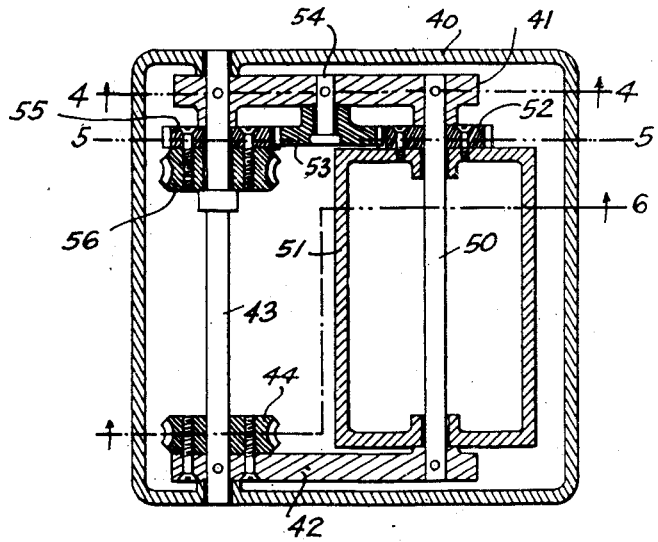
Fig: 4
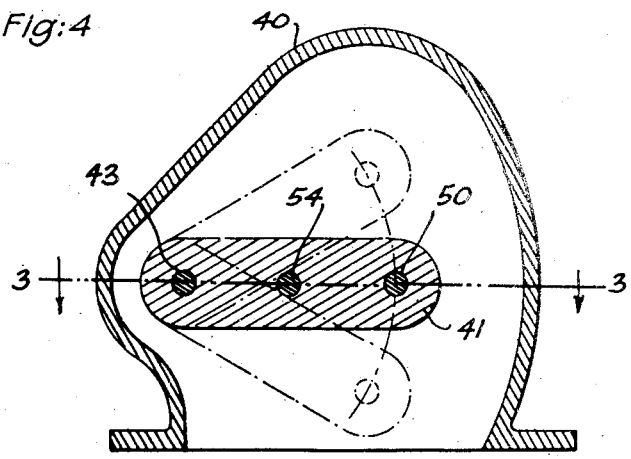
Alfred Simmon
Louis L. Weisglass
INVENTORS
BY Walter S. Wallheim
ATTORNEY.

Feb. 11, 1947.  A. SIMMON ET AL  2,415,568
PHOTOGRAPHIC ENLARGER
Filed Oct. 19, 1945  4 Sheets-Sheet 4
Fig: 5
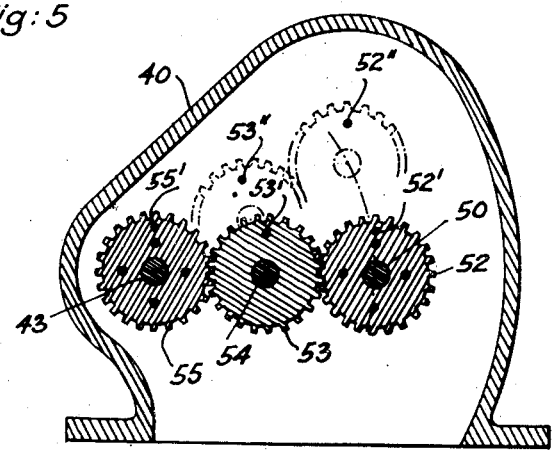
Fig: 6
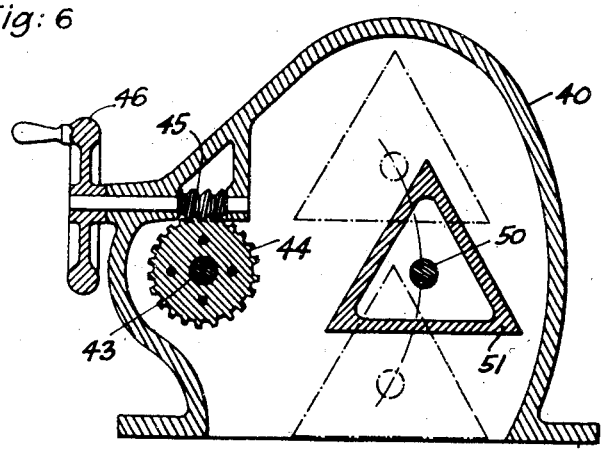
Fig: 7
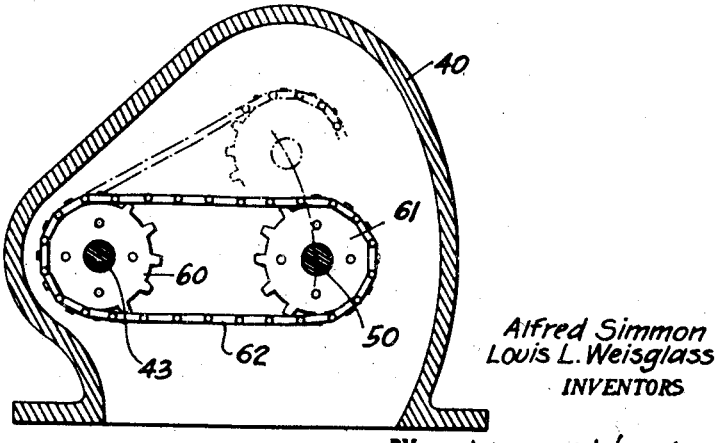
Alfred Simmon
Louis L. Weisglass
INVENTORS
BY Walter E. Wollheim
ATTORNEY.

Patented Feb. 11, 1947

2,415,568

UNITED STATES PATENT OFFICE 2,415,568

PHOTOGRAPHIC ENLARGER

Alfred Simmon, Jackson Heights, and Louis L. Weisglass, New York, N. Y., assignors to Simmon Brothers, Inc., Long Island City, N. Y., a corporation of New York Application October 19, 1945, Serial No. 623,292

4 Claims. (Cl. 88—24)

The object of this invention is an improved photographic enlarger of the general type that has been broadly disclosed in a co-pending application Serial No. 577,216, filed by Louis L. Weisglass, one of the co-inventors. The projector assembly of this enlarger comprises a conventional enlarging lens and a conventional condenser, but the source of light is a diffusely reflecting surface disposed substantially in the focal point of this condenser and illuminated by a spotlight. Compared to the conventional arrangement in said focal point of a lamp with an opal vessel and emitting diffused light, this arrangement offers a much better utilization of the available light and permits the application of much higher wattages than heretofore possible. For a detailed description of the general principle involved and for a discussion of the gains in efficiency and light output, we wish to refer to the co-pending application No. 577,216.

In another co-pending application Serial No. 609,873, filed by Louis L. Weisglass, one of the co-inventors, a simple method has been disclosed by means of which the light output of such an enlarger can be controlled by changing the position of the diffuse reflector. In another co-pending application Serial No. 614,208, also filed by Louis L. Weisglass, one of the co-inventors, methods have been disclosed by means of which the light color of such an enlarger can be changed by using exchangeable colored reflectors. It is the object of the present invention to provide a simple mechanism which permits the operator to control the intensity as well as the color of the emitted light of an enlarger of this general type.

In Fig. 1 and 2, are shown, respectively, a front and a side view of an enlarger built according to our invention, both views being partly cross sectional.

Figs. 3, 4, 5 and 6 show various cross sectional views through the head of the lamp housing showing in detail the mechanism for intensity and color control. More specifically, Fig. 3 shows a horizontal cross sectional view along the plane of line 3—3 in Fig. 4; Fig. 4 shows a cross sectional view along the plane of line 4—4 in Fig. 3; Fig. 5 is a cross sectional view along the plane of line 5—5 in Fig. 3; and Fig. 6 is a cross sectional view along the plane of line 6—6 in Fig. 3.

Fig. 7 is a cross sectional view similar to Fig. 5, but showing a modification of the gear arrangement illustrated in Fig. 5.

Like characters of reference denote similar parts throughout the various views and the following specification.

The enlarger consists of three principal parts, the base, the upright column and the projector assembly.

The base 10 is preferably made from plywood or the like. On this base is fastened a bracket 11, preferably made from cast iron or aluminum which supports two U-channels 12. These channels are arranged either vertically or, preferably, under a slight angle as shown. Slidably mounted on this vertical or nearly vertical column is the projector assembly. This projector assembly consists of the supporting carriage, the focusing assembly with the enlarging lens, and the lamp housing.

The carriage consists of two steel plates 13 which are bolted together by four bolts 14. These bolts serve at the same time as shafts for rollers 15 by means of which the carriage slides with a small amount of friction on the aforementioned channels 12.

The steel plates 13 have a configuration clearly shown in Fig. 2. Each steel plate has a lug 16 adapted to support the lamp housing. A projection 17 is provided which supports a film stage 18 which, of course, has an aperture of the desired size. The negative, preferably supported by one of the well known types of holders is, during operation, placed on this apertured film stage 18. A film holder suitable for this purpose is, for instance, shown in Patents No. 2,222,185 and 2,239,760.

A lens carrier 19 is supported by at least one and preferably two guide rods 20 and carries the enlarging lens 21. The guide rods 20 run in bearings 22. A focusing device comprising, for example, a rack and pinion movement or the like, not shown in detail, permits the operator to adjust the position of guide rods 20 and therewith of lens support 19 and lens 21 by simply turning hand wheel 23.

The enlarger as described up to this point is quite conventional, and does not depart appreciably from other well known designs.

The lamp housing consists of the main housing 30, preferably an aluminum casting or the like, the condenser with the condenser housing 31 and the condenser lenses 32, the two spotlights 33 and the colored reflector assembly which will be described in detail below. The spotlight may be of any conventional design, but we prefer the type disclosed in detail in co-pending application Serial No. 609,873. This type comprises a lamp and a specular reflector. The reflector is formed partly by a paraboloid and partly by an ellipsoid body of rotation. Means are provided by which the lamp can be adjusted within this reflector. These means and other features of this particular spotlight construction have not been shown in detail because they have been fully disclosed in co-pending application Serial No. 609,873.

The head of the lamp housing contains the adjustable reflector assembly. This head, see Fig. 3, comprises a housing 40 containing a pivoted trunnion consisting of the two arms 41 and 42 which are fixedly attached to the shaft 43 which can rotate in bearings which are part of housing 40. A worm gear 44 is attached to arm 42. Referring now to Fig. 6, this worm gear 44 can be turned by a worm 45 which, in turn, is connected to a handwheel 46 mounted in front of the enlarger and which may be actuated by the operator. Obviously, by turning handwheel 46 the operator will rotate worm 45 and thereby worm gear 44. This rotation will, in turn, raise or lower arm 42 and therewith the entire trunnion composed of arms 41 and 42, see Fig. 4.

While one side of each arm 41 and 42 is fixedly attached to shaft 43, the outer side of these arms is fixedly attached to shaft 50. Rotatably mounted on this shaft 50 is a polygonal cylinder 51, Fig. 6, which is shown to be of triangular cross section. This triangular shape was chosen as an example only and it will be understood that a square or hexagonal or any other convenient shape may be selected, if so desired. It will also be understood that each side of this polygonal cylinder carries a reflector which reflects predominantly diffuse light of a selected color. For example, each side of the triangular body, as shown, may support a white, yellow and blue reflector respectively, the white reflector being used for ordinary bromide paper and the yellow and blue reflector for part exposures for so-called "Varigam" paper. "Varigam" is a trade name for a variable contrast bromide paper which upon exposure with blue light gives very contrasty prints, but which upon exposures to yellow light is extremely soft, intermediate degrees of contrast being obtainable by double exposure with blue and yellow light in various percentages, respectively.

Referring now to Fig. 5, fixedly attached to the triangular body 51 is a gear 52 which meshes with an idler gear 53 rotatably supported on shaft 54. Shaft 54, in turn, is attached to arm 41. Idler gear 53, in turn, is in mesh with a gear 55 which is rotatably mounted on the aforementioned shaft 43. Attached to gear 55 is a worm gear 56 which, in turn, is actuated by a worm, not shown, and hand wheel 57, Fig. 1, substantially identical with the ones shown in Fig. 6.

The working function of the device can be understood from this description. The operator manipulates two hand wheels 46 and 57, see Fig. 1. Handwheel 46 through its associated worm 45 turns worm gear 44 and therewith the two arms 42 and 41, see Fig. 4. This, in turn, raises or lowers the triangular reflector carrier 51, see Fig. 6. This mechanism is so dimensioned that in the lowest position, shown in Fig. 2, the side of the reflector carrier which faces the condenser is substantially in the focal point of said condenser. In this manner the highest possible light output is obtained, i. e., the two spotlights 33 project a concentrated spot of light on the reflector mounted on the lower surface of the triangular reflector carriage. This concentrated spot of light, in turn, becomes the light source proper for the optical system of the enlarger, and an image of this concentrated spot of light is projected by the condensers in the usual manner into the pupil of the enlarging lens.

As mentioned before, the operator by revolving hand wheel 46 can lower or raise the reflector carrier 51 in the manner shown in Figs. 4 and 6. The more the operator raises it, the more said body becomes defocused with respect to both the condenser and the two spotlights and, therefore, the optical efficiency of the system becomes less and less. By raising the reflector carrier approximately 2" the light still reaching the enlarging lens, as well as the bromide paper, can be reduced to approximately 4% of its maximum value.

We have shown in Fig. 6 that the triangular reflector carrier is raised parallel to itself, i. e., its lower side which is horizontal remains horizontal at all times. Ordinarily, the reflector carrier would not move in this manner, but would rather maintain its position relative to the two trunnion arms 41 and 42. That means it would not only change its vertical position but would also perform a slight rotary motion, the angle of rotation with respect to the horizontal being as large as the angle of rotation performed by the trunnion arms 41 and 42. This rotation is prevented by the gear arrangement shown in detail in Fig. 5. We have marked in this drawing with a black dot three teeth 52', 53', and 55' of the three gears 52, 53, and 55 respectively. Gear 55, as long as hand wheel 57 is not being turned, is kept automatically in its present position, i. e., raising or lowering the trunnion arms 41 and 42 will not affect its position. Raising the trunnion arms 41 and 42, however, will affect the position of gears 52 and 53 and they may, for example, assume the position shown in dotted lines in Fig. 5. Since gear 55 is kept stationary, gear 53 will perform a small counter-clockwise rotation and tooth 53' will now assume the position 53". This counter-clockwise rotation of gear 53, of course, causes a corresponding clockwise rotation of gear 52 and, if gears 52 and 55 have the same number of teeth, this clockwise rotation will exactly offset the counter-clockwise rotation induced by the counter-clockwise rotation of the two trunnion arms 41 and 42. In other words, tooth 52' assumes position 52" which shows that gear 52 has not rotated at all with respect to the horizontal during the raising movement of trunnion arms 41 and 42. In other words, if a line connecting tooth 52' to the center of shaft 50 was vertical before the rotary movement of the trunnion, it will remain vertical at all times. Since gear 52 is fixedly attached to the triangular reflector carrier 51 it follows that this reflector carrier, by the rotary movement of the trunnion, will also be raised or lowered parallel to itself and, if its lower surface was horizontal at the beginning of this movement, it will remain horizontal at all times.

In the foregoing paragraphs we have explained what happens when we keep worm gear 56 and the associated spur gear 55 stationary and give the trunnion a rotary motion by rotating hand wheel 46 and worm gear 44. We shall now explain what happens in the opposite case, i. e., when we keep hand wheel 46 and therewith worm gear 44 and trunnion arms 42 and 41 stationary but rotate hand wheel 57 and therewith worm gear 56. What takes place in this case is quite simple. The rotary motion of worm gear 56 is transferred through spur gears 55 and 53 to spur gear 52. This spur gear is fixedly attached to the triangular reflector carrier 51 which therefore also rotates. The shaft 50 is, of course, stationary since the trunnion arms 41 and 42 are stationary, being kept in this position by the now stationary worm gear 44. Consequently, rotating hand wheel 57 simply rotates the reflector carrier 51 and the operator now may rotate it for example by one-third of a revolution and thereby bring another reflector of a different color into the effective position in which it is being illuminated by the two spotlights. The correct position of the reflector can readily be ascertained by the color of the image on the easel.

The mechanism described, therefore, gives the operator the possibility of either rotating hand wheel 46 thereby raising and lowering the reflector 51 in order to control the light output without rotating it, or to rotate hand wheel 57 thereby rotating the reflector body 51 in order to bring another colored reflector into the effective position without raising or lowering it. In other words, the operator can now control the light color and the light intensity independently.

Fig. 7 shows an alternate construction consisting of two sprockets 60 and 61 connected by a chain 62 which elements takes the place of the three spur gears 52, 53, and 56 shown in Fig. 5. It will be clear that this construction assures the parallel movement of the reflector carrier 51 in precisely the same manner as the three spur gears shown in Fig. 5.

It will be obvious that the construction as disclosed may be subjected to numerous changes and modifications without departing from the spirit of this invention. For example, hand wheels 46 and 57 may be either singly or both replaced by small electric motors which may be remotely controlled by any convenient method.

Many other changes of form, proportions and minor details of construction may be resorted to without departing from the principles or sacrificing any of the advantages of the invention as defined in the appended claims.

What we claim as new is:

1. A photographic enlarger comprising a supporting structure and a projector assembly, said projector assembly including a support for a photographic negative, an enlarging lens in front of said negative, means to adjust the distance from said lens to said negative for focusing purposes, a condenser behind said negative, a polygonal cylinder behind said condenser, a plurality of reflectors reflecting predominantly diffuse light of different colors, respectively, mounted on the sides of said cylinder, one of these sides facing said condenser, at least one spotlight illuminating said last mentioned side, and means under the control of the operator to rotate said polygonal cylinder whereby one of said reflectors of a selected color is placed into the illuminated position, and independent means to change the position of said polygonal cylinder with respect to said condenser, whereby said illuminated reflector in one extreme position is substantially in the focal point of said condenser, thus delivering maximum light output, and in the other extreme position is farther away from said condenser, thus delivering a smaller light output, intermediate degrees of light output being obtainable by placing said polygonal cylinder into positions between said two extreme positions.

2. A photographic enlarger comprising a supporting structure and a projector assembly, said projector assembly including a support for a photographic negative, an enlarging lens in front of said negative, means to adjust the distance from said lens to said negative for focusing purposes, a condenser behind said negative, a polygonal cylinder behind said condenser, a plurality of reflectors reflecting predominantly diffuse light of different colors, respectively, mounted on the sides of said polygonal cylinder, one of these sides facing said condenser, at least one spotlight illuminating said last mentioned side, a trunnion carrying said polygonal cylinder, and means under the control of the operator to rotate said polygonal cylinder whereby one of said reflectors of a selected color is placed into the illuminated position, and independent means to change the position of said polygonal cylinder with respect to said condenser by swiveling said trunnion, whereby said illuminated reflector in one extreme position is substantially in the focal point of said condenser, thus delivering maximum light output, and in the other extreme position is farther away from said condenser, thus delivering a smaller light output, intermediate degrees of light output being obtainable by placing said polygonal cylinder into position between said two extreme positions.

3. A photographic enlarger comprising a supporting structure and a projector assembly, said projector assembly including a support for a photographic negative, an enlarging lens in front of said negative, means to adjust the distance from said lens to said negative for focusing purposes, a condenser behind said negative, a housing, a polygonal cylinder within the housing and behind said condenser, a plurality of reflectors reflecting predominantly diffuse light of different colors, respectively, mounted on the sides of said polygonal cylinder, one of these sides facing said condenser, at least one spotlight illuminating said last mentioned side, a trunnion pivoted within said housing and carrying said polygonal cylinder, and means under the control of the operator to rotate said polygonal cylinder whereby one of said reflectors of a selected color is placed into the illuminated position, said means to rotate comprising a first gear supported by said housing and its axis coinciding with the pivot of said trunnion, a second gear connected to said polygonal cylinder, both gears having the same number of teeth, a third gear supported by said trunnion and in mesh with said first and second gear, and means to rotate said first gear and thereby the other gears and said polygonal cylinder, and independent means to change the position of said polygonal cylinder with respect to said condenser by swiveling said trunnion, whereby said illuminated reflector in one extreme position is substantially in the focal point of said condenser, thus delivering maximum light output, and in the other extreme position is farther away from said condenser, thus delivering a smaller light output, intermediate degrees of light output being obtainable by placing said polygonal cylinder into positions between said two extreme positions.

4. A photographic enlarger comprising a supporting structure and a projector assembly, said projector assembly including a support for a photographic negative, an enlarging lens in front of said negative, means to adjust the distance from said lens to said negative for focusing purposes, a condenser behind said negative, a housing, a polygonal cylinder within the housing and behind said condenser, a plurality of reflectors reflecting predominantly diffuse light of different colors, respectively, mounted on the sides of said polygonal cylinder, one of these sides facing said condenser, at least one spotlight illuminating said last mentioned side, a trunnion pivoted within said housing and carrying said polygonal cylinder, and means under the control of the operator to rotate said polygonal cylinder whereby one of said reflectors of a selected color is placed into the illuminated position, said means to rotate comprising a first sprocket supported by said housing and its axis coinciding with the pivot of said trunnion, a second sprocket connected to said polygonal cylinder, both sprockets having the same number of teeth, a chain connecting both sprockets, and means to rotate said first sprocket and thereby the other sprocket and said polygonal cylinder, and independent means to change the position of said polygonal cylinder with respect to said condenser by swiveling said trunnion, whereby said illuminated reflector in one extreme position is substantially in the focal point of said condenser, thus delivering maximum light output, and in the other extreme position is farther away from said condenser, thus delivering a smaller light output, intermediate degrees of light output being obtainable by placing said polygonal cylinder into positions between said two extreme positions.

ALFRED SIMMON.
LOUIS L. WEISGLASS.

REFERENCES CITED

The following references are of record in the file of this patent:

UNITED STATES PATENTS

| Number | Name | Date |
|---|---|---|
| 2,346,988 | Noel | Apr. 18, 1944 |
| 1,807,047 | Risdon | May 26, 1931 |
| 2,349,260 | Garraway | May 23, 1944 |